US010402214B2

United States Patent
Garrett

(10) Patent No.: US 10,402,214 B2
(45) Date of Patent: Sep. 3, 2019

(54) DEVICE PROVIDED SCRIPT TO CONVERT COMMAND

(71) Applicant: Hewlett Packard Enterprise Development LP, Houston, TX (US)

(72) Inventor: Michael R. Garrett, Cypress, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 141 days.

(21) Appl. No.: 15/114,375

(22) PCT Filed: Jan. 31, 2014

(86) PCT No.: PCT/US2014/014194
§ 371 (c)(1),
(2) Date: Jul. 26, 2016

(87) PCT Pub. No.: WO2015/116176
PCT Pub. Date: Aug. 6, 2015

(65) Prior Publication Data
US 2016/0342435 A1    Nov. 24, 2016

(51) Int. Cl.
*G06F 9/455* (2018.01)

(52) U.S. Cl.
CPC ............... *G06F 9/45512* (2013.01)

(58) Field of Classification Search
CPC .................................. G06F 13/4022
See application file for complete search history.

(56) References Cited

U.S. PATENT DOCUMENTS

| | | | |
|---|---|---|---|
| 5,659,690 A | 8/1997 | Stuber | |
| 6,529,743 B1* | 3/2003 | Thompson | H04M 1/72527 455/556.1 |
| 8,249,730 B2* | 8/2012 | Chieng | G06F 3/162 700/94 |
| 8,266,301 B2 | 9/2012 | Moore et al. | |
| 8,271,974 B2 | 9/2012 | Mazhar et al. | |
| 8,359,415 B2 | 1/2013 | Brown et al. | |
| 2009/0063718 A1 | 3/2009 | Sekine | |
| 2009/0154556 A1* | 6/2009 | Kim | H04L 65/1083 375/240.02 |
| 2011/0209137 A1* | 8/2011 | Berg | G06F 3/1204 717/171 |
| 2011/0264702 A1* | 10/2011 | Maine | H04L 12/6418 707/793 |
| 2012/0030272 A1 | 2/2012 | Bristow | |

(Continued)

OTHER PUBLICATIONS

ISA/KR, International Search Report, dated Sep. 30, 2014, PCT/US2014/014194, pp. 9.

(Continued)

*Primary Examiner* — Henry Tsai
*Assistant Examiner* — Juanito Borromeo
(74) *Attorney, Agent, or Firm* — Hewlett Packard Enterprise Patent Department

(57) ABSTRACT

Techniques for using device provided scripts to convert commands are provided. In one aspect, a scripting engine may be implemented to execute a script provided by a device. The script may convert the command from a first format to a second format. A command may be received in the first format. The script may be executed by the scripting engine to convert the command to the second format.

18 Claims, 8 Drawing Sheets

(56) References Cited

U.S. PATENT DOCUMENTS

| | | |
|---|---|---|
| 2012/0131590 A1 | 5/2012 | Brownlow et al. |
| 2013/0013830 A1 | 1/2013 | Jia |
| 2014/0365862 A1* | 12/2014 | Qu .................. G06F 17/2247 715/234 |
| 2016/0241876 A1* | 8/2016 | Xu .................. H04N 1/4466 |

OTHER PUBLICATIONS

Yu, Z. et al.; Research of IPMI Management Based on BMC SOC; 2010 IEEE, 3 Pgs.

* cited by examiner

DEVICE PROVIDED SCRIPT TO CONVERT COMMAND

BACKGROUND

In a computer system, a management controller, such as a Baseboard Management Controller (BMC) may be coupled to various devices in the computer system. Some examples of devices may include Host Bus Adaptors (HBA), Network Interface Controllers (NIC), or other similar types of devices. For simplicity, such devices are referred generally as devices or adaptors. The devices may be coupled to the management controller over a bandwidth limited binary communications channel. For example, the devices and management controller may be coupled to each other over a communications channel such as an Inter-Integrated Circuit ($I^2C$) bus, System Management Bus (SMBus), Serial Peripheral Interface (SPI) bus, or other, similar type of communications channel. The management controller may communicate with the device over this communications channel to produce and consume configuration for the device and to query the device for operational statistics.

DETAILED DESCRIPTION

Figure 1:
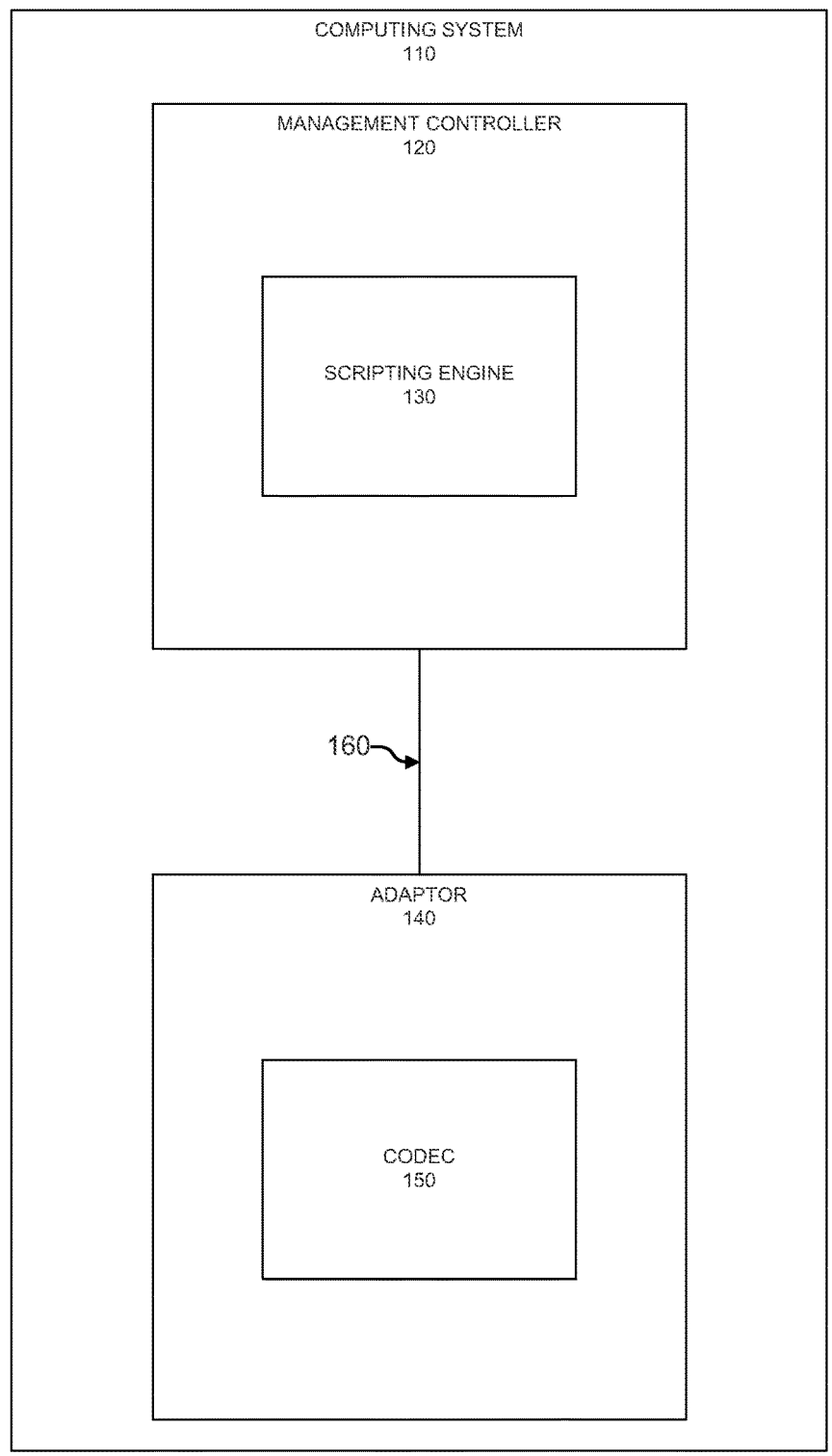
FIG. 1 is an example of a system implementing the techniques described herein to convert commands using device provided scripts.

Management controllers may interface with adaptors over relatively low bandwidth binary connections. In order to efficiently use the binary connections, firmware/software running on the management controller may be synchronized with the adaptor such that the exchange of data between the two entities may be made more efficient. For example, a certain binary sequence, sent over the binary channel may be defined by both the management controller and the adapter as a request for a pre-specified parameter. For example, in the case of a NIC, the binary value 0xff may be defined as a request to retrieve the media access control (MAC) address of the NIC. The NIC may receive this command and send the result as a binary value in a specified format over the binary channel. For example, a MAC address may be specified as six two digit values separate by colons (e.g. 00:11:22:33: 44:55). Because the colons are in a fixed position, and are not dependent on the value of the address, the colons may be omitted on the binary channel. The colons may then be reinserted by the management controller.

As should be clear, this tight coupling of the adaptor and management controller may lead to several types of problems. For example, because the interpretation of the binary format must be agreed upon by both the management controller and the adaptor, changes to either the controller or the adaptor may need to be synchronized. This problem is further exacerbated when the adaptor and management controller vendors are not the same. An update to the adaptor or management controller software may render the communications channel unusable, until corresponding updates are made to the corresponding component.

Another problem that arises is the limited bandwidth of the binary communications channel between the adaptor and the management controller limits the amount of information that can be sent. In some implementations, management controllers may operate using a self describing object format, such as JavaScript Object Notation (JSON) or extensible markup language (XML). In generally, these object are human readable, although this is not a required attribute. These objects may be utilized by an interface on the management controller to perform management functions. For example, the interface may be a Representational State Transfer (REST) interface.

In a REST implementation of a management interface, REST operations (e.g. GET, PUT, POST, DELETE), are used to pass objects (e.g. JSON objects) to perform operations. For example, an oversimplified MAC address JSON representation may be, "MacAddress": "aa:bb:cc:dd:ee:ff". A REST command to retrieve the MAC address from a NIC may be (again, oversimplified), GET (adaptor resource locator): "MacAddress": "aa:bb:cc:dd:ee:ff". As can be seen, the REST implementation requires significantly more information to be transmitted as compared to the binary implementation described above.

The techniques described herein overcome these problems by use of a scripting engine included on a management controller. The scripting engine is able to execute a script that is provided by the adaptor. The script, when executed by the management controller is able to convert requests from a first format, such as an object format, like JSON, to a second format, such as a binary format. The script is also able to convert a binary format into an object format. Because the script is provided by the adaptor itself, there is no need to synchronize the software running on the management controller and the adaptor. The script, which can also be referred to as a codec, is created at the same time as the firmware/software for the adaptor, and contains all of the necessary conversion routines to convert object (such as JSON) based requests into binary requests that can be sent over a low bandwidth binary channel.

When a object based request is received at the management controller, the scripting engine executes the adaptor provided script to convert the request to the corresponding binary request. Furthermore, when a binary response is received at the management controller from the adaptor, the script engine may execute the script to convert the binary response to an object based response. In addition, the adaptor may include a resource map, which allows the adaptor to describe the various data elements on the adaptor that can be configured or retrieved. Thus, the resource map may inform the management controller about the data elements that are settable/retrievable on/from the adaptor.

FIG. 1 is an example of a system implementing the techniques described herein to convert commands using device provided scripts. Computing system 110 may include a management controller 120, an adaptor 140, and a binary communications channel 160 coupling the management controller and the adaptor. It should be noted that computing system 110 may include many other components (not shown) to enable the system to operate as a computer. For example, the computing system may include system processors, memory, storage devices (such as disk drives), input devices, and many other types of components. For ease of description, these components have not been shown.

The management controller 120 may be a processor that is contained within the computing system and is responsible for management functions. The management controller, which may also be referred to as a management processor, or Baseboard Management Controller (BMC), may be coupled to the various components within the computing system 110 and may handle management functions for those components. Some examples of management functions may include configuration of components or retrieving operational performance statistics of components.

The management controller may be coupled to an external system (not shown) that may be in turn connected to management controllers of other computer systems to provide a centralized location for management of multiple computing systems. For example, in a large data center, the management controllers of all the computing systems may be coupled to a central management system. All of the computing systems may then be managed from the central system.

The management controller may also include a scripting engine 130. A scripting engine may be a computing program that is able to execute a script. A script may be human readable text description or a machine readable description of a set of processing steps. The script engine may execute the script to perform the processing steps. There are many examples of scripting engines. In one example implementation, the scripting engine may be a Lua™ scripting engine. Other examples may include Perl, Python, JavaScript, and any number of other scripting languages. The techniques described herein are not dependent on any particular scripting engine.

The computing system may also include an adaptor 140. The adaptor, which may also be generally referred to as a device, may be any component that is in communication with the management controller. Some examples of adaptors may include Network Interface Controllers (NICs), Host Bus Adaptors (HBA), RAID controllers, Smart Array Controllers, or any other type of device that may be coupled to the management controller.

The adaptor may include a coder/decoder (codec). A codec 150 may be a script written in a scripting language that is executable by scripting engine 130. The codec may provide functions, such as converting data from a first format to a second format. For example, a first format may be a JavaScript Object Notation (JSON) format and a second format may be a binary format. The codec may provide functions, that when executed by the scripting engine, converts the data between formats.

The management controller 120 and adaptor 140 may be coupled by a binary channel 160. The binary channel may be a communications channel such as an Inter-Integrated Circuit (I²C) bus, System Management Bus (SMBus), Serial Peripheral Interface (SPI) bus, or other, similar type of communications channel. The techniques described herein are not dependent on the particular protocol used by the communications channel. What should be understood is that the binary communications channel may be bandwidth limited. As such, it may be desirable to make efficient use of the binary communications channel.

In operation, the management controller may wish to communicate with the adaptor. For example, the management controller may wish to send configuration information to the adaptor. Or in other cases, the management controller may wish to retrieve data from the adaptor. A management request, command, and management command refer to instances when the management controller wishes to communicate with the adaptor. In some cases the management command may be generated by the centralized management system and sent to the management controller. In other cases, the command may be generated by the management controller itself. Techniques described herein are not dependent on the source of the management request.

In some implementations, the management request may be received in the form of a JSON object that is transmitted as part of a Representational State Transfer (REST) interface. However, the techniques described herein are not dependent on the particular object type used, or the particular architecture used. For example, the techniques described herein would be equally applicable to a extensible markup language (XML) object transferred over Simple Object Access Protocol (SOAP).

The management controller may first determine if the management controller has access to the correct version of the codec that is stored on the adaptor. In one example implementation, the management controller may query the adaptor over the binary communications channel to retrieve a version identifier of the codec. In some implementations, the version identifier may be a hash of the codec, such that any change in the codec results in a different HASH. If the management controller does not have access to a version of the codec having the hash value returned by the adaptor, the management controller may request that the adaptor provide the codec over the binary communications channel. The codec retrieved from the adaptor may be referred to as an adaptor provided codec.

As explained above, the binary communications channel may be a limited bandwidth channel. Thus it may be desirable to limit the amount of data sent over the channel. Once the management controller has received the codec from the adaptor, the management controller may store the codec, along with the version identifier. Upon the next command, the management controller may compare the currently stored codec version with the version id returned by the adaptor. If the version ids are the same, there may be no need for the management controller to request the codec a second time.

The management controller may then execute the script included in the codec using the scripting engine. The script may instruct the scripting engine to convert the management request in the first format to a second format. For example, the management request in a JSON format may be converted to a binary format. As explained above, self describing formats such as JSON or XML contain a lot of data that is needed for purposes of description, but is not needed for actual operation. The codec may provide functions that convert the JSON (or equivalent format) object into a simplified binary format. The binary format may be referred to as a binary request, binary command, or simply a binary format. What should be understood is that the binary format does not contain the self description elements of a JSON or XML object.

The management controller may then send the binary request over the binary channel to the adaptor. The adaptor may be configured to understand the binary request and perform the desired operation. AS explained above, the operation may be a configuration operation or a request to retrieve data from the adaptor. The particular function the binary command performs is not important to the techniques described herein. The adaptor may then send a binary response to the management controller. Again, the binary response may be sent over the binary channel.

The management controller, upon receipt of the binary response over the binary channel, may convert the binary response to a adaptor management response using the codec and the scripting engine. An adaptor management response may be a binary response from the adaptor converted into the object format used by the management controller. For example, the binary response may be converted by the scripting engine to a JSON format. In some implementations, the management controller may query the adaptor for the version id of the adaptor provided codec to ensure that the codec version stored by the management controller is still the current version in use for the adaptor.

Figure 2:
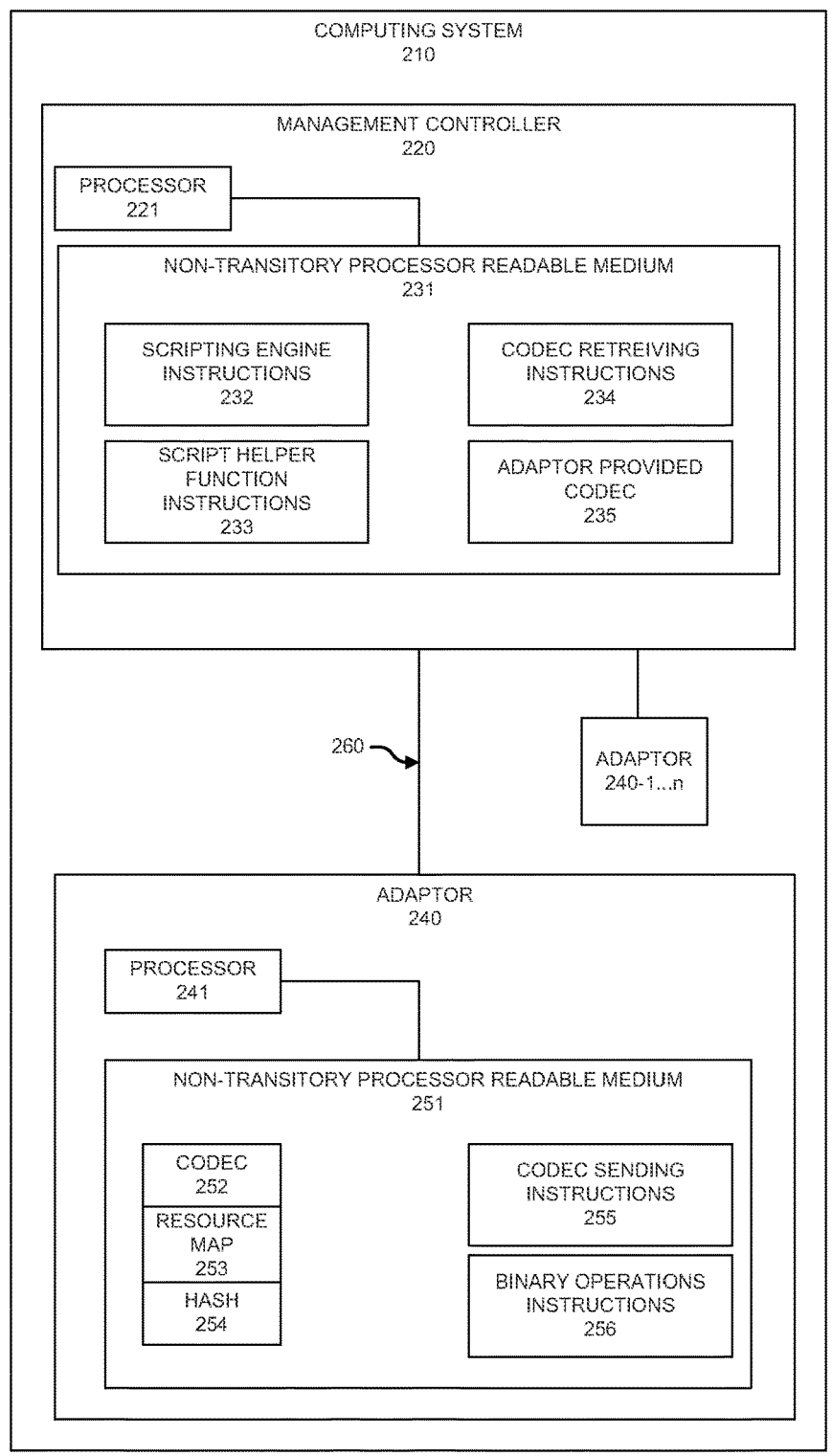
FIG. 2 is another example of a system implementing the techniques described herein to convert commands using device provided scripts.

FIG. 2 is another example of a system implementing the techniques described herein to convert commands using device provided scripts. Computing system 210 may again include a management controller 220 and an adaptor 240. The management controller and adaptor shown in FIG. 2 are generally the same as those shown in FIG. 1, with additional details provided. Computing system may contain any number of additional adaptors 240-1 . . . n, which may have a structure that is generally the same as that shown for adaptor 240.

Management controller 220 may include a processor 221. Coupled to the processor may be a non-transitory processor readable medium 231. The non-transitory processor readable medium may contain thereon a set of instructions, which when executed by the processor, cause the processor to implement the techniques described herein. The medium 231 may also act as a data store to provide storage for data, as will be described below.

The medium 231 may include scripting engine instructions 232. The scripting engine instructions 232, when executed by the processor may cause the processor to implement a scripting engine that is able to execute scripts, such as those contained within the adaptor provided codec described above. As mentioned above, one example of a scripting engine is a Lua™ scripting engine, although techniques described herein are not dependent on any particular scripting engine.

The medium 231 may also include script helper function instructions. In some cases, certain functions that may be performed by a scripting engine executing a script may be performed more efficiently by the processor executing code in a native environment. The techniques described herein may provide script helper functions, which may be functions that are intended to execute directly on the processor, thus bypassing the scripting engine. Scripts may be written such that when a script helper function is available to perform a certain task, the scripting engine may pass control to the helper function to execute directly on the processor. Once the function is complete, execution may be resumed by the scripting engine. One example of such a function may be in parsing a JSON object to locate a particular element. A helper function may be provided that directly locates the element within the object using an offset. Thus, the scripting engine does not need to parse the object.

The medium 231 may also include codec retrieving instructions 234. As explained above, the techniques described herein determine if the management controller has access to the version of the codec that is currently stored on the adaptor. The codec retrieving instructions may instruct the processor to query the adaptor to determine the version of the codec contained thereon. The codec retrieving instructions may then compare the retrieved version id to the version id of a previously stored codec. If there is no codec with the retrieved version id, the codec retrieving instructions may instruct the processor to retrieve the codec form the adaptor over the binary channel 260. Once the codec is retrieved, it may be stored on the medium as the adaptor provided codec 235. It should be understood that the version id is also stored as part of the codec 235, and may be used by the codec retrieving instructions to determine if a proper version of the codec is available.

Although only a single adaptor provided codec is shown, it should be understood that there may be many such codecs. For example, there may be a separate codec for each adaptor 240, 240-1 . . . n included in the system. In some cases, there may be no need to store codecs for each adaptor individually. For example, if there are two identical adaptors, each with the same version id for the codec, only one copy may need to be stored. Once the codec has been retrieved for the first time, subsequent requests would result in the management controller determining that the current version of the codec is accessible. Thus, there is no need to retrieve the codec a second time.

The adaptor 240 may also include a processor 241. Coupled to the processor may be a non-transitory processor readable medium 251. The non-transitory processor readable medium may contain thereon a set of instructions, which when executed by the processor, cause the processor to implement the techniques described herein.

The medium 251 may include a codec 252. As explained above, a codec may include scripts executable by a scripting engine to convert data from a first format to a second format. For example, between a binary format and a object (e.g. JSON, XML) format. The codec is provided by the adaptor and is generated at the time that the firmware/software for the adaptor is created. Thus, the codec is in sync with the firmware/software running on the adaptor. The codec may contain functions that are executable by the scripting engine to convert object data from a first format (such as JSON) to a binary format that is directly understandable by the adaptor.

The medium 251 may also include a resource map 253. The resource map may be an indication of the various date elements that may be configured and/or read by the management controller. In other words, the resource map may allow the adaptor to describe its capabilities to the management controller. This allows the management controller to know what operations may be performed on the data elements of the adaptor, or what data elements may be retrieved from the adaptor.

The medium 251 may also include a hash 254. The hash may be used as a version identifier for the codec. As mentioned above, the management controller verifies that the version of the codec available to the management controller is the same as the version contained on the adaptor itself. The version id may be generated by performing a hash of the codec. Thus, any changes to the codec may result in a different hash. Thus, if the hash 254 contained on the adaptor is equal to the version id stored by the management controller, then the management controller is ensured that the codec accessible to the controller and the codec stored on the adaptor are the same. If the values do not match, the management controller is notified that the codec should be retrieved from the adaptor.

The medium 251 may also contain codec sending instructions 255. As explained above, the management controller may query the adaptor for the version id of the codec. The codec sending instructions may retrieve the hash 254 in response to a version query and send the value to the management controller over the communications channel. If the management controller determines the codec should be retrieved from the adaptor, the codec sending instructions may receive the request for the codec and return the codec 252 to the management controller over the binary channel.

The medium may also include binary operation instructions 256. AS explained above, the management controller, utilizing the scripting engine and codec may convert management requests into a binary format. The binary format request may be sent to the adaptor. The binary operations instructions 256 may receive the binary format commands and perform the desired operation on the adaptor. For example, in the case of a MC, a binary command may be interpreted by the binary operations instructions to be a request for the Media Access Control (MAC) address of the NIC. The binary operations instructions may retrieve the MAC address and return the address as a binary response over the binary channel. The management controller may then convert the binary response to an adaptor management response using the codec and scripting engine.

Figure 3:
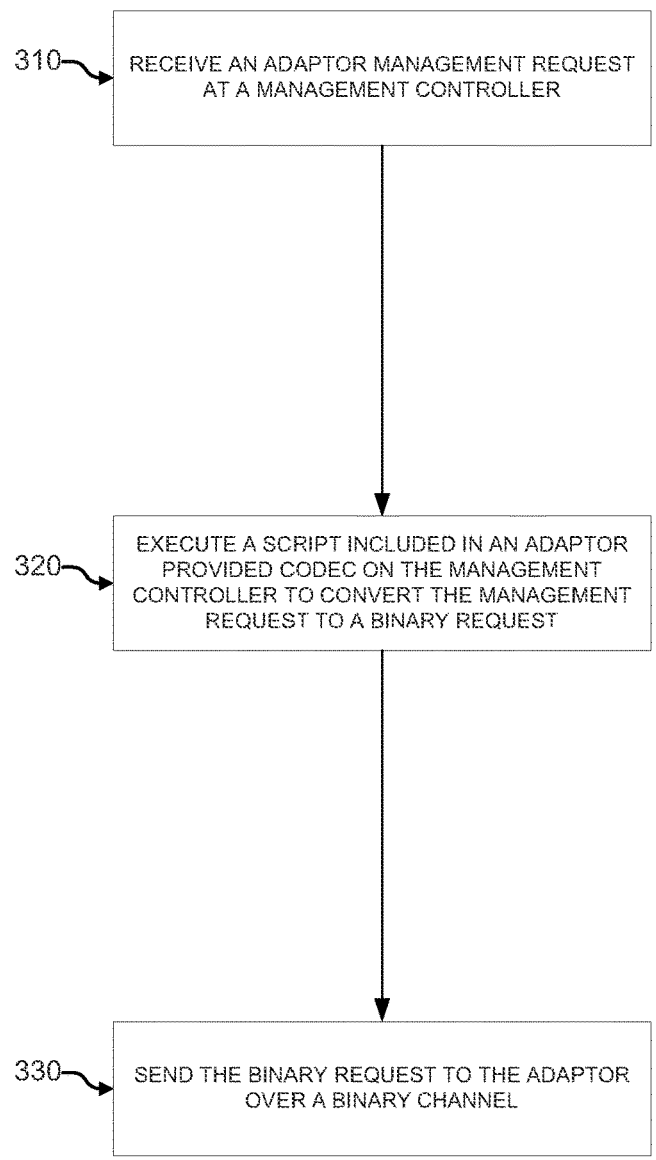
FIG. 3 is an example of a high level flow diagram for converting management requests to a binary format according to techniques described herein.

FIG. 3 is an example of a high level flow diagram for converting management requests to a binary format according to techniques described herein. In block 310, an adaptor management request may be received at a management controller. As explained above, the request may be received at the management controller from an external source, or may be generated at the management controller itself. In any case, the request may involve communication with the adaptor.

In block 320, an adaptor provided codec script may be executed on the management controller. The script may be used to convert the management request to a binary request. As explained above, the binary format may be a format that is capable of being processed by the adaptor. In block 330, the binary request may be sent to the adaptor over a binary channel. As explained above, the binary channel may be a communications channel that may have a lower bandwidth than other channels to the management controller. Thus, it may be more efficient to transmit requests to the adaptor in a binary format over the binary channel, as opposed to a less efficient format such as text based JSON.

Figure 4:
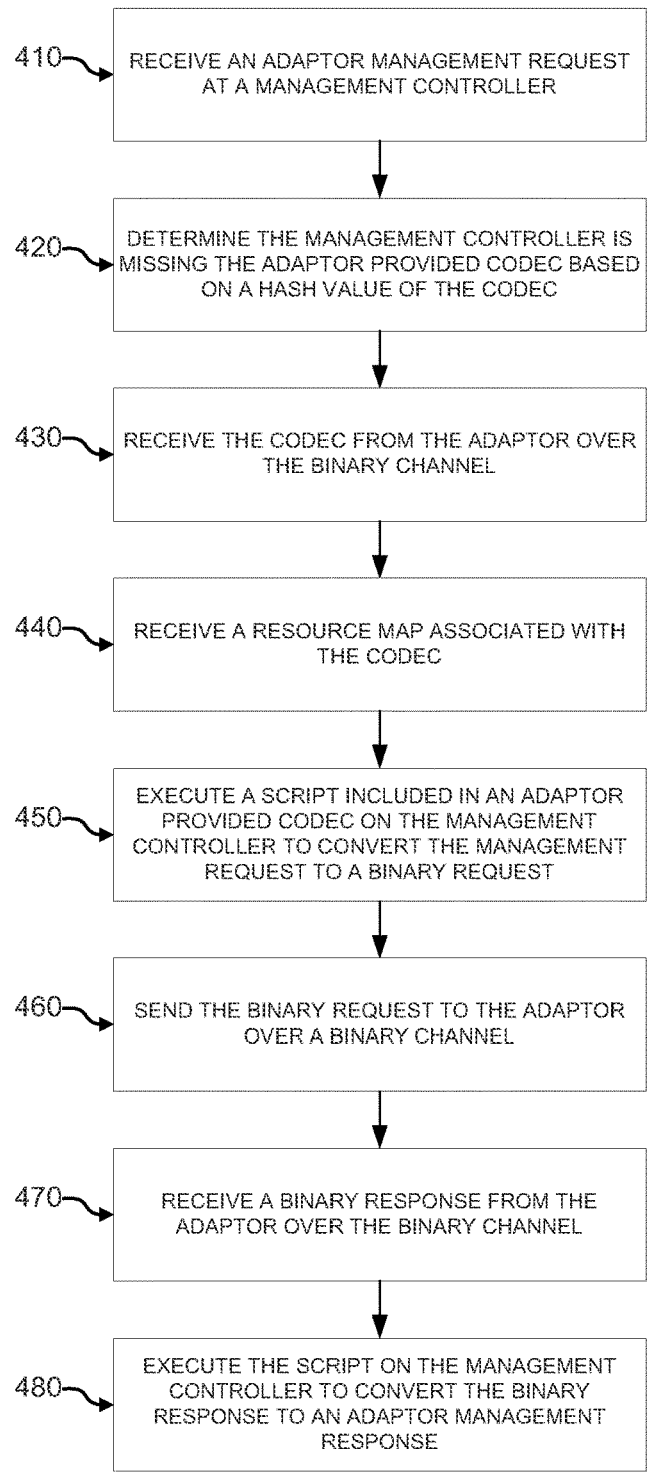
FIG. 4 is an example of a high level flow diagram for converting management requests/responses to/from a binary format according to techniques described herein.

FIG. 4 is an example of a high level flow diagram for converting management requests/responses to/from a binary format according to techniques described herein. In block 410, as above in block 310, an adaptor management request may be received at a management controller. In block 420, the management controller may determine that the adaptor provided codec is missing, based on a hash value of the codec. As explained above, a version identifier for the codec, of which a hash value is one type, may be used to determine the proper version of the adaptor provided codec. If there is no hash value, indicating the management controller does not have the codec, or if the hash value does not correspond to the version of the codec contained on the adaptor, the management controller may need to retrieve the codec.

In block 430, the management controller may receive the codec from the adaptor over the binary channel. As explained above, the binary channel may be a communications channel between the management controller and the adaptor that has limited bandwidth. Thus, minimizing the number of times the codec is transferred between the adaptor and the management controller may be desirable. In block 440, a resource map associated with the codec may be received. The resource map may provide the management controller with a guide to the data that is available from/needed by the adaptor.

In block 450, a script included in the adaptor provided codec may be executed on the management controller to convert the management request to a binary request. As explained above, management requests may be in a format, such as JSON, that may not be suitable for transmission over a lower bandwidth channel, such as the binary channel. The script may include instructions that convert the text based management request into a binary format. In block 460, the binary request may be sent to the adaptor over the binary channel.

In block 470, a binary response may be received from the adaptor over the binary channel. As explained above, in some cases, the adaptor may not have sufficient capabilities to provide a text based response, such as a JSON response. The adaptor may respond to the binary request with a binary response sent over the binary channel. In block 480, the management controller may execute a script to convert eh binary response to an adaptor management response. The adaptor management response may be a text based response, for example, a JSON formatted response.

Figure 5:
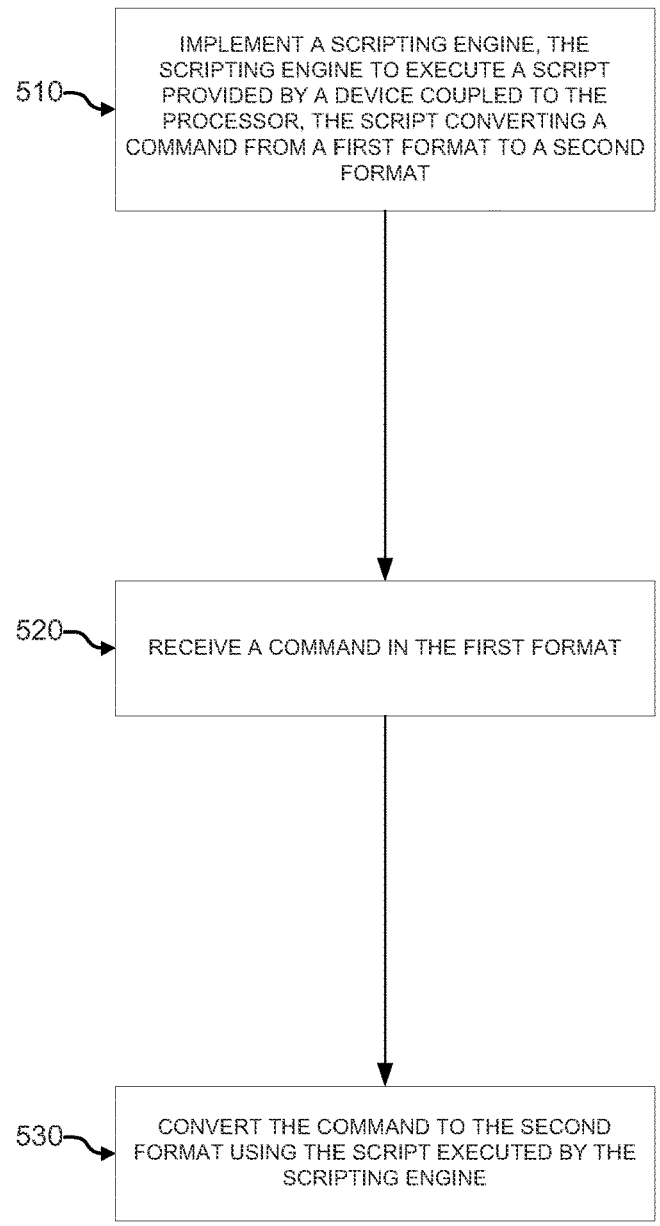
FIG. 5 is an example of a high level flow diagram for converting commands from a first format to a second format according to techniques described herein.

FIG. 5 is an example of a high level flow diagram for converting commands from a first format to a second format according to techniques described herein. In block 510, a scripting engine may be implemented to execute a script provided by a device coupled to a processor. The script may convert a command from a first format to a second format. As explained above, the first format may be a text based format, such as the JSON format, for example. The second format may be a binary based format, such as a raw number that may be interpreted by the device or may be converted by the script to/from the text based format.

In block 520, a command may be received in the first format. The command may be received by a management controller. The command may be in the first, text based format. In block 530, the command may be converted to the second format using the script executed by the scripting engine. As described above, the script may contain routines to convert the first, text based format, to a second, binary based format. In block 530, the command in the first format may be converted to the second format.

Figure 6:
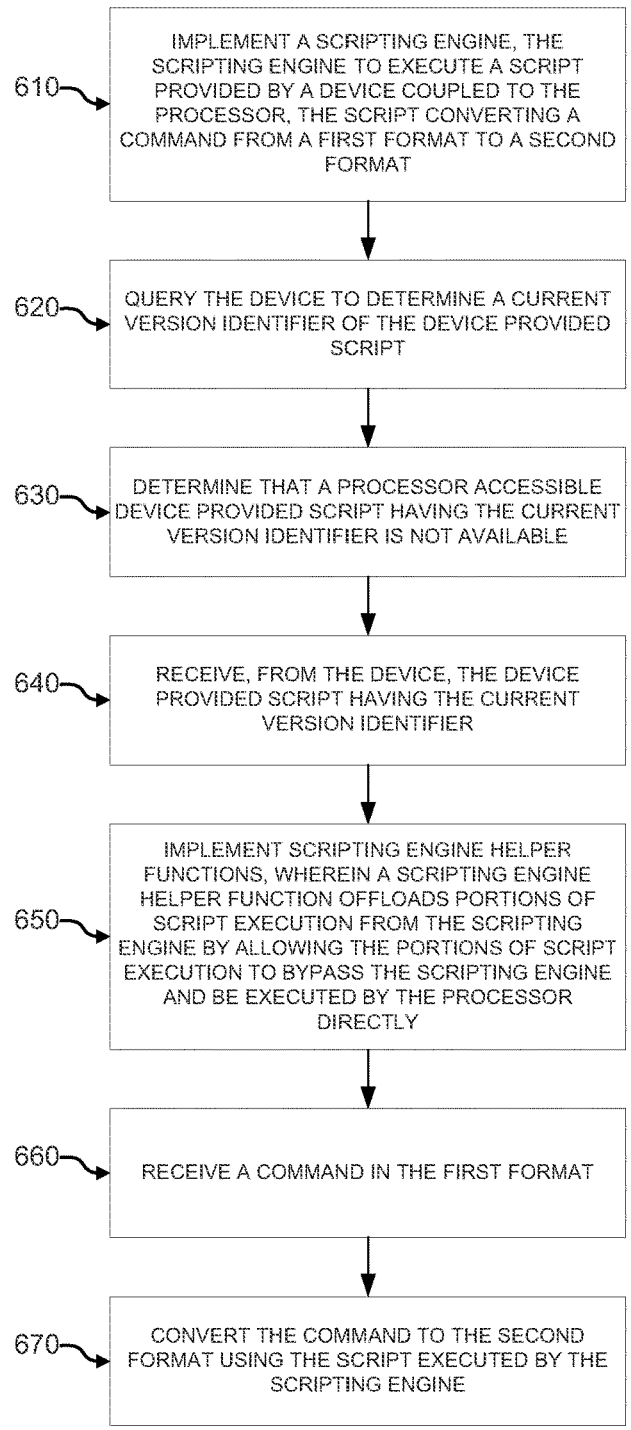
FIG. 6 is another example of a high level flow diagram for converting commands from a first format to a second format according to techniques described herein.

FIG. 6 is another example of a high level flow diagram for converting commands from a first format to a second format according to techniques described herein. In block 610, just as in block 510, a scripting engine to execute a script may be implemented on a management controller. In block 620, a query may be sent to the device to determine a current version identifier of the device provided script. As described above, in an example implementation, the version identifier may be a hash of the device provided script.

In block 630, a determination may be made that a processor accessible device provided script having the current version identifier is not available. As described above, this may be because no version of the script is available, or the version of the script that is available does not match the current version retrieved from the device. In block 640, the device provided script have the current version identifier may be received from the device. In other words, if the processor does not have access to the current version of the device provided script, the current version is then received from the device.

In block 650, scripting engine helper functions may be implanted by the processor, wherein a scripting engine helper function offloads portions of script execution from the scripting engine by allowing the portions of the script execution to bypass the scripting engine and be executed by the processor directly. In other words, the techniques provided herein allow for certain functions to be implemented in native processor code, such that the function need not be executed by the scripting engine.

In block 660, just as above in block 520, a command may be received in the first format, such as a text format. For example, the first format may be a JSON format. In block 670, just as in block 530, the command in the first format may be converted using the scripting engine, to a second format. For example, the second format may be a binary format suitable for transmission to the device over a low bandwidth binary channel.

Figure 7:
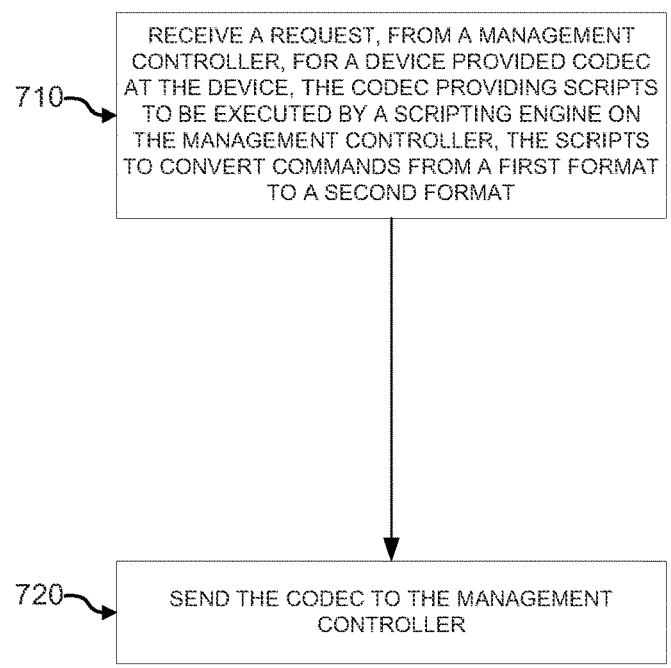
FIG. 7 is an example of a high level flow diagram for sending a codec to a management controller according to techniques described herein.

FIG. 7 is an example of a high level flow diagram for sending a codec to a management controller according to techniques described herein. In block 710, a request may be received, from a management controller, for a device provided codec, at the device. The codec may provide scripts to be executed by a scripting engine on the management controller. The scripts may convert commands from a first format to a second format. For example, in one implementation, the scripting engine may be a Lua™ scripting engine. The scripts may convert requests from a binary format to a JSON format, or from a JSON format to a binary format.

In block 720, the device may send the codec to the management controller. Again, as explained above, the device itself may include the codec which contains the scripts used to convert from, for example, a binary format to a JSON format (or vice versa). As explained above, because the conversion process is included with the device and is provided by the device itself to the management controller, the management controller does not need a priori knowledge of the codec. The device may simply provide the codec when the codec is requested by the management controller.

Figure 8:
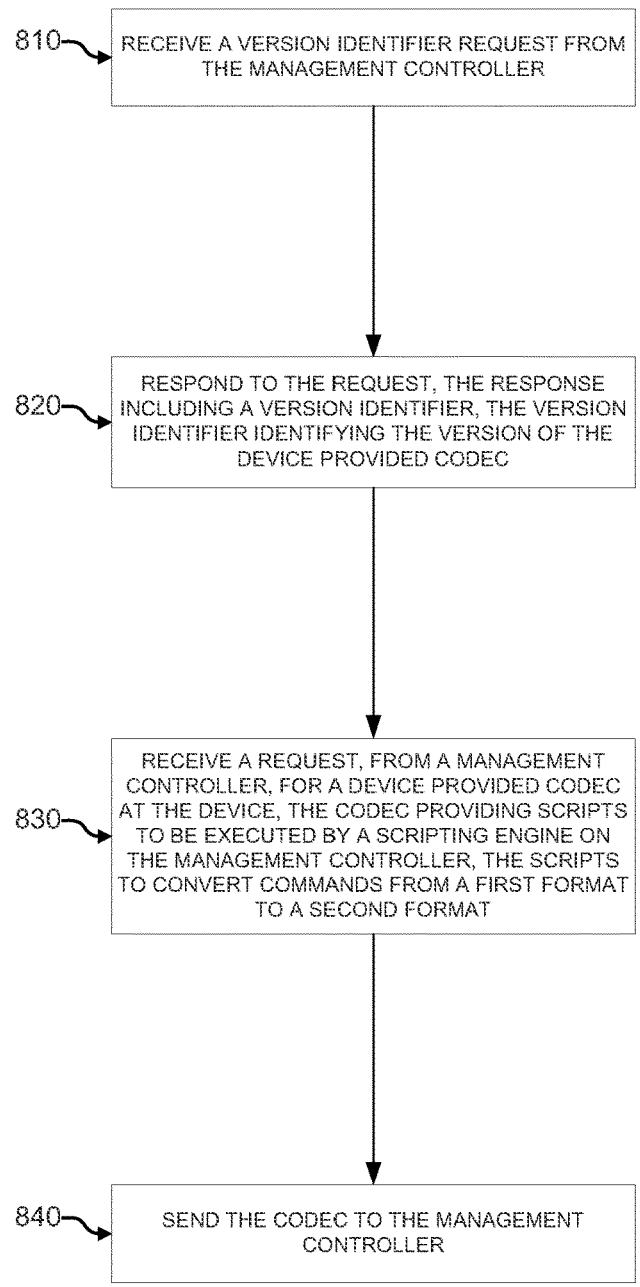
FIG. 8 is another example of a high level flow diagram for determining a version and sending a codec to a management controller according to techniques described herein.

FIG. 8 is another example of a high level flow diagram for determining a version and sending a codec to a management controller according to techniques described herein. In block 810, a version identifier request may be received from the management controller at a device. As explained above, the version identifier may be used to specify the version of the codec contained on the device and may be used by the management controller to determine if the management controller has the proper version of the codec for the device.

In block 820, the device may respond to the request. The response may include a version identifier that identifies the version of the device provided codec. If the management controller has previously received a codec for the device, the received version identifier may be compared with the version identifier of the previously received codec. If there is a match, there may be no need to request the codec from the device. In block 830, as above in block 710, a request from the management controller for the codec may be received at the device. In block 840, as above in block 720, the codec may be sent from the device to the management controller.

I claim:

1. A method comprising:
receiving an adaptor management request in an object format at a management controller, the management controller including a scripting engine;
determining whether the management controller has access to an adaptor provided codec for converting the adaptor management request;
receiving, based on a determination that the management controller does not have access to the adaptor provided codec, the adaptor provided codec from an adaptor;
executing, by the scripting engine, a script included in the adaptor provided codec to convert the adaptor management request to a binary request, wherein the management controller stores the adaptor provided codec;
sending the binary request from the management controller to the adaptor over a binary channel;
receiving, from the adaptor, a binary response over the binary channel in response to the adaptor performing an operation based on the binary request; and
executing, by the scripting engine, the adaptor provided codec stored on the management controller to convert the binary response to an adaptor management response in the object format.

2. The method of claim 1 further comprising:
determining the management controller is missing the adaptor provided codec based on a hash value of the codec; and
receiving the codec from the adaptor over the binary channel.

3. The method of claim 1 wherein the script is a Lua script.

4. The method of claim 1 wherein the adaptor management request is a JavaScript Object Notation (JSON) request.

5. The method of claim 1 wherein the adaptor provided codec is provided from one of a plurality of adaptors that utilize the same codec.

6. The method of claim 1 further comprising:
executing script helper functions, the script helper functions provided by the management controller, and executed in a management controller native environment.

7. The method of claim 2 wherein receiving the codec from the adaptor further comprises:
receiving a resource map associated with the codec.

8. A non transitory processor readable medium containing thereon a set of instructions, which when executed by a processor of a management controller cause the processor to:
implement a scripting engine disposed in the management controller, the scripting engine to execute a script provided by a device coupled to the processor, the script provided to the management controller based on a determination that the management controller does not have access to the script for converting a command from a first format to a second format, wherein the management controller stores the script provided by the device;
receive, at the processor, the command in the first format;
convert the command from the first format to the second format using the script executed by the scripting engine;
send the command in the second format from the management controller to the device;
receive, from the device, a response in the second format responsive to the device performing an operation based on the command in the second format; and
execute, by the scripting engine, the script stored on the management controller to convert the response in the second format to the first format.

9. The medium of claim 8 further comprising instructions which cause the processor to:
query the device to determine a current version identifier of the script provided by the device;

determine that a processor accessible device-provided script having the current version identifier is not available; and receive, from the device, another script provided by the device having the current version identifier.

10. The medium of claim 8 wherein the first format is a binary format and the second format is a JavaScript Object Notation (JSON) format.

11. The medium of claim 8 wherein the first format is a JavaScript Object Notation (JSON) format and the second format is a binary format.

12. The medium of claim 8 further comprising instructions which cause the processor to:

implement scripting engine helper functions, wherein a scripting engine helper function offloads portions of script execution from the scripting engine by allowing the portions of script execution to bypass the scripting engine and be executed by the processor directly.

13. A method comprising:

receiving, by a device, a request from a management controller, for a binary device-provided codec, the binary device-provided codec providing scripts to be executed by a scripting engine on the management controller, the scripts to convert commands received at the management controller from a first format to a second format;

sending the binary device-provided codec from the device to the management controller, wherein the binary device-provided codec is stored on the management controller;

receiving, by the device from the management controller, the commands converted to the second format via the scripting engine executing the binary device-provided codec;

performing, by the device, an operation based on the commands in the second format, wherein performing the operation generates a response in the second format; and sending, by the device to the management controller, the response in the second format to be converted to the first format via the scripting engine executing the binary device-provided codec stored on the management controller.

14. The method of claim 13 further comprising:

receiving a version identifier request from the management controller; and responding to the version identifier request, the response including a version identifier, the version identifier identifying a version of the device provided codec.

15. The method of claim 13 wherein the device is an adaptor.

16. The medium of claim 8 wherein the device is an adaptor.

17. The method of claim 15, further comprising:

receiving a configuration request from the management controller via a binary channel, wherein the configuration request is based on the device-provided codec; and performing the configuration request by the device.

18. The method of claim 7, further comprising:

using, by the management controller, the resource map to configure the adaptor.

* * * * *